United States Patent
Cohen et al.

(10) Patent No.: US 8,463,671 B1
(45) Date of Patent: Jun. 11, 2013

(54) ROUTING ARCHITECTURE FOR ONLINE AND OFFLINE PROCESSING

(75) Inventors: Nir Cohen, Tel-Mond (IL); Yishai Levanoni, Or-Yehuda (IL); Doron Shalit, Givaataim (IL)

(73) Assignee: Amdocs Software Systems Limited, Dublin (IE)

(*) Notice: Subject to any disclaimer, the term of this patent is extended or adjusted under 35 U.S.C. 154(b) by 1520 days.

(21) Appl. No.: 11/103,915

(22) Filed: Apr. 11, 2005

Related U.S. Application Data

(60) Provisional application No. 60/656,681, filed on Feb. 25, 2005.

(51) Int. Cl.
  *G07F 19/00* (2006.01)
  *H04M 15/00* (2006.01)
  *G07B 17/00* (2006.01)

(52) U.S. Cl.
  USPC .............................................. 705/34; 705/30

(58) Field of Classification Search
  USPC ......................................................... 705/34
  See application file for complete search history.

(56) References Cited

U.S. PATENT DOCUMENTS

| | | | | |
|---|---|---|---|---|
| 5,832,460 A | * | 11/1998 | Bednar et al. | 705/27 |
| 5,873,030 A | * | 2/1999 | Mechling et al. | 455/408 |
| 6,640,097 B2 | * | 10/2003 | Corrigan et al. | 455/414.1 |
| 7,280,816 B2 | * | 10/2007 | Fratti et al. | 455/405 |
| 2002/0103762 A1 | * | 8/2002 | Lopez et al. | 705/63 |
| 2004/0064409 A1 | * | 4/2004 | Kight et al. | 705/40 |
| 2004/0102182 A1 | * | 5/2004 | Reith et al. | 455/410 |
| 2004/0209622 A1 | * | 10/2004 | Kotzin | 455/452.1 |

\* cited by examiner

*Primary Examiner* — Paul Danneman
(74) *Attorney, Agent, or Firm* — Zilka-Kotab, PC

(57) ABSTRACT

A system, method and computer program product are provided for billing purposes. Initially, a customer is associated with a policy. In use, an event is received that is associated with a customer and a category. It is then determined whether to process the event using an online charging platform or an offline charging platform based on the policy and the category. If it is determined that the event is to be processed using the online charging platform, the event is processed using the online charging platform for authorizing and/or charging the event immediately. On the other hand, if it is determined that the event is to be processed using the offline charging platform, the event is processed using the offline charging platform for billing the user at the end of a billing period.

12 Claims, 5 Drawing Sheets

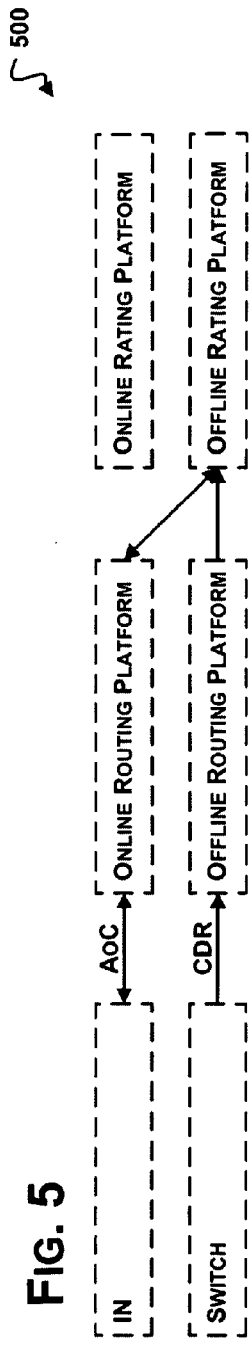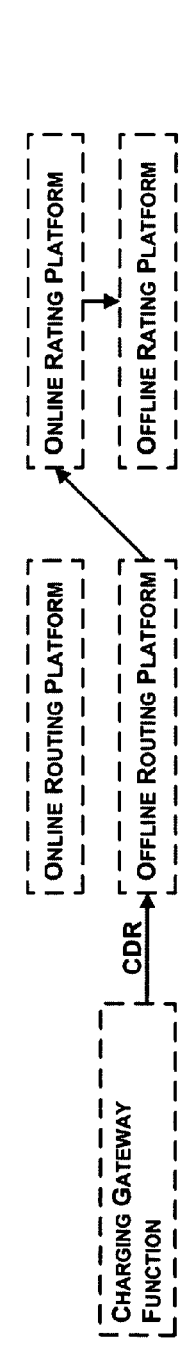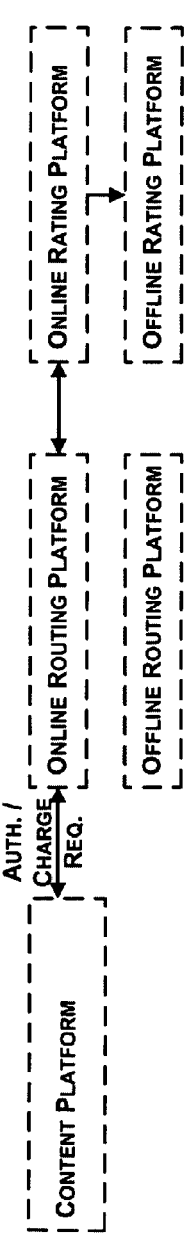

ROUTING ARCHITECTURE FOR ONLINE AND OFFLINE PROCESSING

RELATED APPLICATION(S)

The present application claims priority from a provisional application filed Feb. 25, 2005 under application Ser. No. 60/656,681, which is incorporated herein by reference in its entirety.

FIELD OF THE INVENTION

The present invention relates to billing systems, and more particularly, to online and offline billing systems.

BACKGROUND OF THE INVENTION

Traditionally, billing systems typically employ two modes of charging. The first is online charging which is where the user effectively pre-pays for a service, and the second is offline charging where a user is billed after the service. Thus, the first charging method is implemented as a "pay-as-you-go" system, whereas the second method is implemented where the user is billed at regular intervals for services which the user has used.

The availability requirement from online charging platforms is typically much higher with respect to offline platforms. In addition, there are events that are processed using the online platform in order to ensure low latency, e.g., 200 ms, while other events do not require such a low latency. Further, network events that are processed by the charging platforms may arrive from many network elements and in different modes, i.e., as synchronous requests, batch files, etc. These factors lead to the need for bolstering the resources associated with online charging platforms.

Unfortunately, a problem often arises in that it is difficult to efficiently route events, such that only events that must be processed using the online charging platform are routed to such system, in order to reduce the volume and cost of online charging platforms. The difficulty in addressing this problem is further exacerbated due to the fact that there is no simple way of controlling this routing. For example, the arrival mode of an event (i.e. synchronous, batch, etc.) does not provide a clear indication as to whether the event is to be processed online or offline.

There is thus a need for overcoming these and/or other problems associated with the prior art.

SUMMARY

A system, method and computer program product are provided for billing purposes. Initially, a customer is associated with a policy. In use, an event is received that is associated with a customer and a category. It is then determined whether to process the event using an online charging platform or an offline charging platform based on the policy and the category. If it is determined that the event is to be processed using the online charging platform, the event is processed using the online charging platform for authorizing and/or charging the event immediately. On the other hand, if it is determined that the event is to be processed using the offline charging platform, the event is processed using the offline charging platform for billing the user at the end of a billing period.

BRIEF DESCRIPTION OF THE DRAWINGS

FIGS. 5-7 show one example of implementing a billing method, in accordance with one embodiment.

DETAILED DESCRIPTION

Figure 1:
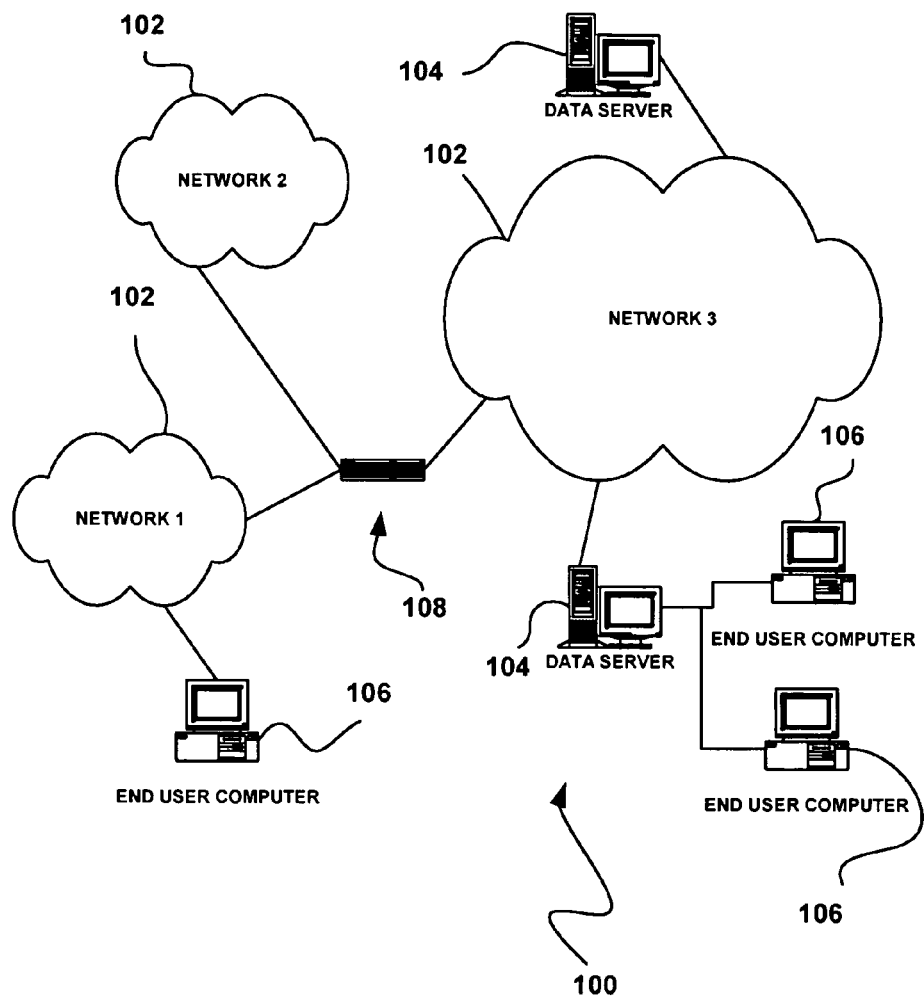
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various billing features. For example, the various data server computers 104 and/or end user computers 106 may be equipped with a billing system, for reasons that will soon become apparent.

Figure 2:
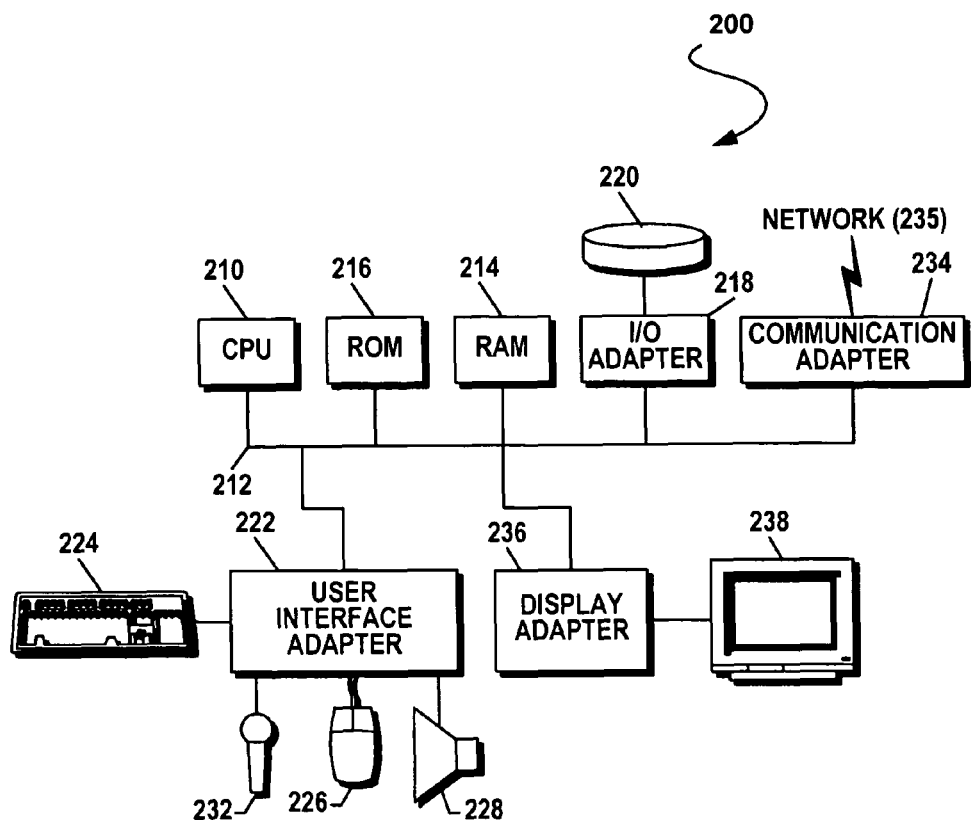
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
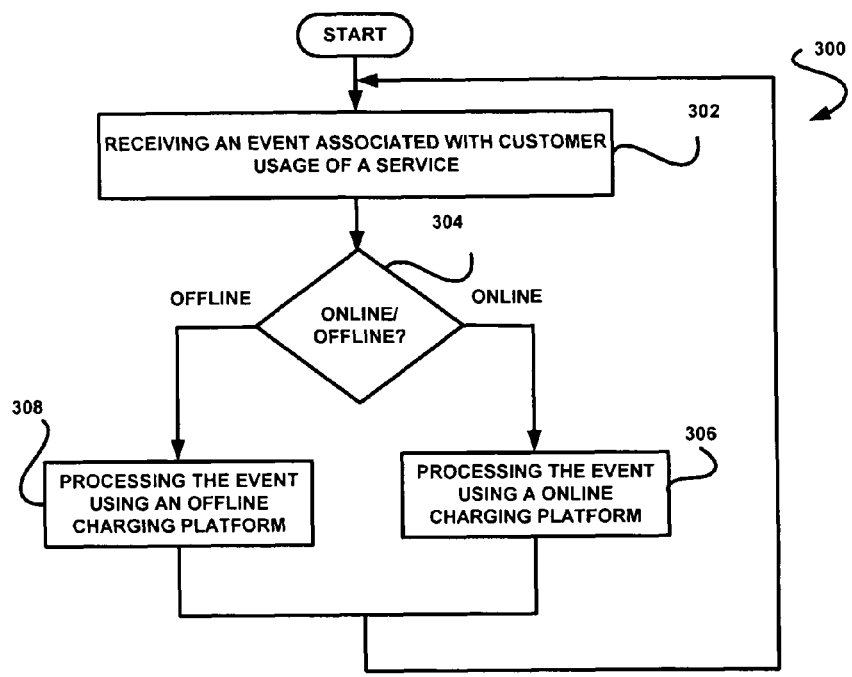
FIG. 3 shows a billing method, in accordance with one embodiment.

FIG. 3 shows a billing method 300 for billing users for events, in accordance with one embodiment. As an option, the billing method 300 may be implemented in the context of the architecture and environment of FIGS. 1 and/or 2. Of course, however, the billing method 300 may be carried out in any desired environment.

Initially, in operation 302, an event is received. Such event may include any aspect of customer usage of any type of service. Further, the service may include, but is not limited to, telecommunication, Internet, multi-media-related content, and/or absolutely any type of service that requires billing. For reasons that will soon become apparent, the event is associated with a category and a customer, where the customer is, in turn, associated with a policy.

Next, in decision 304, it is determined whether to process the event using an online charging platform or an offline charging platform, based on the category and the customer policy. As an option, the online charging platform may include any platform that is capable of billing against a prepaid balance, and the offline charging platform may include any platform that is capable of billing for services that are associated with a postpaid account. In the context of the present description, the online charging platform may include any billing platform that is highly available and guaranties low latency during responses, where the offline charging platform is not required to send a response at all. Of course, the online charging platform may include any billing platform that is faster or more efficient than the offline charging platform.

In one embodiment, the policy may indicate whether the event is associated with services paid in association with a prepaid balance, and/or services that are paid by a postpaid account. Further, the policy may identify whether the online or offline charging platform is suitable for processing the event, based on various parameters (e.g. customer accumulations, customer specific rating schemas, charging policies, customer balance, etc.). As a further option, such policy may be processed, in real-time, upon receipt of the event, to determine, at the time of routing, whether the online or offline charging platform is appropriate.

In another embodiment, each customer may be assigned two rating partitions which are reflected in the policies of each event arising during customer usage of a server. A customer online rating partition may be provided including customer charging-related information for authorizing a service request, i.e., balance and rating counters. Further, a customer offline rating partition may be provided including customer charging-related information that is not required for authorizing a service, i.e., billing counters in case the service was charged in the online charging platform and all counters in case the service is charged in the offline charging platform.

In still yet another embodiment, each policy may be associated with the category. Specifically, a plurality of categories may be provided, each with a relation to all of the policies. The events may then be associated with a category, whereby the customer is associated with a policy. More optional information associated with such exemplary embodiment will be set forth hereinafter during referenced to subsequent figures.

As noted in operation 306, if it is determined in decision 304 that the event is to be processed using the online charging platform, the event is processed using the online charging platform for billing the user for the event. Further, if it is determined in decision 304 that the event is to be processed using the offline charging platform, the event is processed using the offline charging platform for billing the user for the event. See operation 308.

The method 300 thus provides an effective way of allowing event processing to be allocated between an online and offline platform, so that online platform resources are preserved as much as possible. To this end, events associated with the same customer may be processed differently, based on the category associated with each event and the policy associated with the customer.

More illustrative information will now be set forth regarding various optional architectures and features with which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
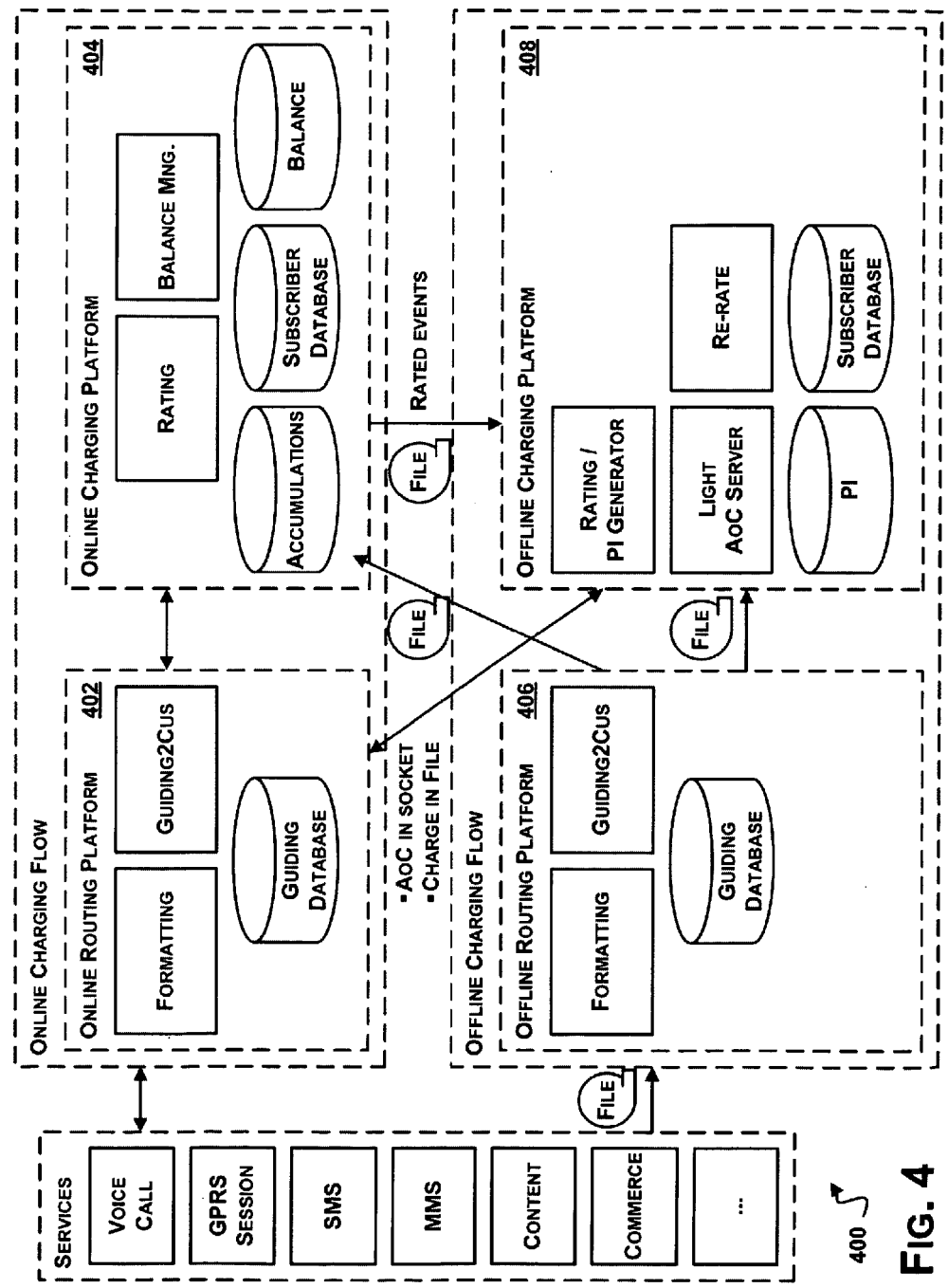
FIG. 4 shows one exemplary architecture for implementing a billing method, in accordance with another embodiment.

FIG. 4 shows one exemplary architecture 400 for implementing a billing method (e.g. billing method 300 of FIG. 3, etc.), in accordance with another embodiment. As an option, the exemplary architecture 400 may be implemented in the context of the details of FIGS. 1-5. Of course, however, the exemplary billing architecture 400 may be carried out in any desired environment.

As shown, the architecture 400 may include four platforms that serve different functionalities. Specifically, such architecture 400 may include an online routing platform 402, an online charging platform 404, an offline routing platform 406, and an offline charging platform 408.

In use, the online routing platform 402 and the offline routing platform 406 group events together into categories for routing purposes. Each event that arrives from a network may be associated with a routing category, according to operator business needs. Further, a list of categories may be associated with an event distribution rule and pricing schema automatically, according to qualified events.

To this end, the policy, or routing policy, may define, for each routing category, to which charging platform, e.g., online or offline, events are to be routed. In order to achieve optimal routing granularity, each customer may be assigned a routing policy according to an assigned set of services and/or event distribution rules. In use, routing logic may route an event according to the routing category in which the event resides, the associated routing policy, and customer online/offline rating partitions.

Tables 1A and 1B illustrate an exemplary set of routing categories and policies, respectively:

TABLE 1A

Routing Categories

Voice—includes all events that represent voice calls
Messaging—includes all events that represent short messaging service (SMS)/multimedia messaging service (MMS)
Data—includes all events that represent a data session
Content—includes all events that represent content

TABLE 1B

| Routing Policy | Voice | Messaging | Data | Content |
| --- | --- | --- | --- | --- |
| Postpaid | Offline | Offline | Offline | Offline |
| Postpaid with online content services | Offline | Offline | Offline | Online |
| Postpaid with online content & data services | Offline | Offline | Online | Online |
| Postpaid with online content, data and messaging services | Offline | Online | Online | Online |
| Prepaid | Online | Online | Online | Online |

In one example of use, a voice call description record (CDR) may be formatted and associated with the voice routing category by the system. The appropriate routing platform may route the event to the offline routing platform 406 for all the above routing policies, except for customers that are associated with prepaid. If the customer is associated with the prepaid routing policy, all associated usage may be routed to the online routing platform 402, since all the routing categories in the prepaid policy have an online value.

Customer routing policy assignment logic may, in one embodiment, be established by identifying the routing categories that are to be processed by the online charging platform 404, and finding a lowest/highest priority routing policy that has an online value for these routing categories. One goal may be to select a routing policy that sends minimal number of routing categories to the online charging platform 404, and sends the rest of the routing categories to offline charging platform 408.

The services that may be included during the routing policy assignment may be those that are effective at the date of the routing policy allocation. If a service is no longer effective or is yet to be effective, i.e., a future transaction, it may not necessarily be taken into account.

As an option, each of the routing categories that prompt use of the online charging platform 404 may be tracked in an online routing category list. Such online routing category list may be constructed to be empty, at first. When the routing policy assignment is finished, the online routing category list may contain all of the routing categories that are to be processed by the online charging platform 404 for a given customer.

If, by chance, a customer is associated with event distribution rules such customer may choose to distribute events from one rule to a prepaid pay channel, and further distribute events from another rule to a postpaid account. In order to enforce the routing of events that are paid by a prepaid pay channel to the online charging platform 404, all of the routing categories that are associated with event distribution that are linked to a prepaid pay channel may be added to the online routing category list.

As mentioned early, the aforementioned policies may take into account various parameters such as pricing schemas, which, in turn, may be used to route events in a variety of ways. For example, a spending limit that does not authorize a service request when the amount spent is above a certain threshold may prompt the associated event to be processed by the online charging platform 404. This may ensure that the events are authorized in real-time, even if the events are paid by a postpaid account. Routing categories that are associated with pricing schemas requiring this type of routing may also be added to the online routing category list.

Group level services that are given to customers who belong to a group create a situation in which the usage of two or more customers may impact a single accumulation. All the events that impact such an accumulation may be routed to the same platform, online or offline, in order to perform the correct rate calculation. For example, free minutes that are shared by a family may be managed by the appropriate online or offline charging platform. If one of the customers in the family is prepaid, all the family voice calls may then be routed to the online charging platform 404. To this end, the online routing category list may be maintained for each group that is associated with group level offers.

Customer level services may also create situations in which events that are associated with different routing categories impact a single accumulation. For example, free units accumulation may be qualified for voice and data events. If the customer pays with a prepaid account for data, the voice calls may be routed to the online charging platform 404, in addition to the data sessions. Measures may thus be taken to ensure that, if one of the routing categories that is associated with a pricing schema exists in the online routing category list, all the routing categories of the pricing schema may be added to the list.

Further, the routing policies may be prioritized in order to minimize the events that are routed to the online charging platform 404. In fact, the routing policy that routes all the events to the offline charging platform 408 may be associated with a lowest priority, and the routing policy that routes all events to the online charging platform 404 may be associated with a highest priority. To this end, only when all the routing categories need to be processed by the online charging platform 404, will the customer be associated with the highest priority routing policy (which is costly).

As a further option, the online routing category list associated with a group may be checked when a customer is assigned with a routing policy, and thereafter updated. In particular, the online routing category list may be updated when group services change. For example, a group may be associated with a free minutes allowance group level service. The free minutes allowance pricing schema may further be associated with a voice routing category. If one of the customers in the group has an 'online value' for the voice routing category, voice may be added to a group online routing category list. Since the free minutes accumulation may be shared by all the customers in the group, the routing policies of all the customers may be checked to ensure that the routing policy routes voice events to the online charging platform 404.

The online routing category list may be updated in even additional scenarios. For example, the online routing category list may be updated when the routing policy of one of the customers in the group changes. For example, the group may be already associated with a free minutes allowance group level service, and one of the customers in the group may change his or her payment method from postpaid to prepaid. The routing policy of that customer may then be changed to route voice events to the online charging platform 404. The routing policy change may trigger a review of the group online routing category list, and the voice routing category may be added to the online routing category list.

FIGS. 5-7 show one example of implementing a billing method (i.e. billing method 300 of FIG. 3, etc.) in accordance with one embodiment. As an option, the example may be implemented in the context of the details of the previous figures. Of course, however, the present example may be carried out in any desired environment.

In the present example, a customer purchases a price plan that includes the following set forth in Table 2.

TABLE 2

Event distribution rule no. 1—associated with all routing categories
Event distribution rule no. 2—associated with Content routing category
Pricing schema no. 1—associated with Data & Content routing categories
Pricing schema no. 2—associated with Voice routing category In use, the customer may request to pay with a prepaid balance for content, and use a postpaid account for other services. The content services may be routed to an online rating platform, because the customer pays with a prepaid balance for such services. Further, the data services may be routed to an online rating platform, since there is a shared accumulator, e.g., free Mbytes, between the content and data services (i.e. see pricing schema no. 1 above). The routing policy that routes content and data services to the online rating platform may include that shown in Table 3.

TABLE 3

| Policy Name | Voice | Messaging | Data | Content |
|---|---|---|---|---|
| Postpaid with online content & data services | Offline | Offline | Online | Online |

As shown in FIG. 5, an event flow 500 for voice services is set forth. Voice calls detail records are shown to arrive in files from a switch. Advice of charge (AoC) requests arrive in a synchronous mode. In use, both of the events are routed to an offline rating platform, because events that are associated with the voice routing category are to be routed to the offline rating platform, according to the customer routing policy.

As shown in FIG. 6, an event flow 600 for data services is set forth. Data sessions detail records arrive, in this example, in files from a charging gateway function. The data session detail records may be routed to the online rating platform because events that are associated with the data routing category are routed to an online rating platform, according to the customer routing policy. After the online required processing is finished on the online rating platform, the event may be dispatched and processed on the offline rating platform for billing purposes.

As shown in FIG. 7, an event flow 700 for content services is set forth. Content authorization and charge requests arrive in a synchronous mode from a content platform. The requests may be routed to an online rating platform. In addition, the charge requests may be dispatched and processed on the offline rating platform for billing purposes.

The online routing platform shown in FIGS. 5-7 may include a stateless component that accepts events from network mediation, formats the events, and routes such events to the charging platform according to the event routing category and the customer routing policy. Table 4 illustrates exemplary requests that may be supported.

TABLE 4

Authorize requests—Authorize requests that are routed to the online rating partition may be processed by the online platform and may be returned to the routing platform with a response to the network, e.g., authorize/not authorize. Authorize requests that are routed to the offline rating partition may be ignored, and an immediate authorize response may be sent to the network. In this way, requests that do not require authorization, but arrive from the network as a synchronous request, may be returned to the network without further processing.
Charge requests—Charge requests that are routed to the online rating partition may be processed by the online platform and may be returned to the routing platform with a response to the network, e.g., success/failure. Charge requests that are routed to the offline rating partition may be written to a file, and an immediate success response may be sent to the network. A different file may be created for each offline rating partition. The file may be routed to the relevant offline rating partition.
Advice of Charge requests—Advice of Charge requests may be routed to either the online or offline rating partition, and may be processed in the charging platform without updating any counters and returned to the routing platform with a response to the network, e.g., the GSM AoC e1-e7 parameters values.

The offline routing platform shown in FIGS. 5-7 may include a stateless component that receives files from network mediation, formats the records inside the file, and routes the same to the charging platform according to the event routing category and the customer routing policy.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A computer-implemented method, comprising:
receiving an event;
determining, utilizing a processor, whether to process the event using an online charging platform or an offline charging platform based on a policy and a category;
if it is determined that the event is to be processed using the online charging platform, processing the event using the online charging platform for billing a user for the event, utilizing a processor; and
if it is determined that the event is to be processed using the offline charging platform, processing the event using the offline charging platform for billing the user for the event, utilizing the processor;
wherein the event is associated with the category;
wherein each of a plurality of policies has a relation with each of a plurality of categories;
wherein each policy indicates, for each category, whether to process the event using the online charging platform or the offline charging platform;
wherein each policy allocates a minimal number of routing categories to the online charging platform, utilizing a prioritization scheme;
wherein each category that prompts processing using the online charging platform is tracked in a list;
wherein the event is related to customer usage of a service associated with a customer;
wherein the customer has one of the policies associated therewith;
wherein it is determined whether to process the event using the online charging platform or the offline charging platform based on the policy associated with the customer;
wherein the policy indicates whether the event is associated with services paid in association with a prepaid balance or services that are paid by a postpaid account, based on a plurality of parameters including at least one of customer accumulations, customer specific rating schemas, charging policies, and a customer balance;
wherein the list is maintained for a group of users associated with a group level offer;
wherein the policy is processed in real time upon receipt of the event;
wherein the policies include postpaid, postpaid with online content services, postpaid with online content and data services, postpaid with online content data messaging services, and prepaid;
wherein multiple events associated with the customer are processed differently, based on the category associated with each of the multiple events and the policy associated with the customer;
wherein the customer is assigned the policy associated with the customer according to an assigned set of services and event distribution rules;
wherein the prioritization scheme includes a prioritization of the policies;
wherein a first one of the policies that routes all events to the offline charging platform is associated with a lowest priority, and a second one of the policies that routes all events to the online charging platform is associated with a highest priority, such that when all the routing categories need to be processed by the online charging platform, the customer is associated with the highest priority policy;

wherein the customer is assigned the policy associated with the customer by identifying the routing categories to be processed by the online charging platform, finding the lowest and highest priority policy that has an online value for the identified routing categories, selecting a policy that sends a minimal number of routing categories to the online charging platform and sends the rest of the routing categories to the offline charging platform.

2. The method of claim 1, wherein the categories include at least one of voice, messaging, data, and content.

3. The method of claim 1, wherein the categories include voice, messaging, data, and content.

4. The method of claim 1, wherein an online routing platform and an offline routing platform each group events together into the categories for routing purposes.

5. The method of claim 1, wherein the one of the policies is associated with the customer by identifying a set of the categories that are to be processed by the online charging platform, finding a highest priority policy that indicates that the set of the categories are to be routed to the online charging platform, and assigning the highest priority policy to the customer.

6. The method of claim 5, wherein services included during the association of the one of the policies with the customer only include those that are effective at a date of the association of the one of the policies with the customer.

7. The method of claim 1, wherein the list is updated when the customer is assigned one of the policies.

8. The method of claim 1, wherein the list is updated when one of the policies assigned to one of the users in the group of users changes.

9. The method of claim 1, wherein a spending limit prevents authorization of a service request when an amount spent is above a certain threshold, and prompts an associated event to be processed by the online charging platform.

10. The method of claim 1, wherein the customer chooses to distribute the event from one of the event distribution rules to a prepaid pay channel when the customer is associated with the event distribution rules.

11. A computer program product embodied on a computer readable medium, comprising:
   computer code for receiving an event;
   computer code for determining whether to process the event using an online charging platform or an offline charging platform based on a policy and a category;
   computer code for, if it is determined that the event is to be processed using the online charging platform, processing the event using the online charging platform for billing a user for the event; and
   computer code for, if it is determined that the event is to be processed using the offline charging platform, processing the event using the offline charging platform for billing the user for the event;
   wherein the computer program product is operable such that the event is associated with the category;
   wherein the computer program product is operable such that each of a plurality of policies has a relation with each of a plurality of categories;
   wherein the computer program product is operable such that each policy indicates, for each category, whether to process the event using the online charging platform or the offline charging platform;
   wherein the computer program product is operable such that each policy allocates a minimal number of routing categories to the online charging platform, utilizing a prioritization scheme;
   wherein the computer program product is operable such that each category that prompts processing using the online charging platform is tracked in a list;
   wherein the computer program product is operable such that event is related to customer usage of a service associated with a customer;
   wherein the computer program product is operable such that the customer has one of the policies associated therewith;
   wherein the computer program product is operable such that it is determined whether to process the event using the online charging platform or the offline charging platform based on the policy associated with the customer;
   wherein the computer program product is operable such that the policy indicates whether the event is associated with services paid in association with a prepaid balance or services that are paid by a postpaid account, based on a plurality of parameters including at least one of customer accumulations, customer specific rating schemas, charging policies, and a customer balance;
   wherein the computer program product is operable such that the list is maintained for a group of users associated with a group level offer;
   wherein the computer program product is operable such that the policy is processed in real time upon receipt of the event;
   wherein the policies include postpaid, postpaid with online content services, postpaid with online content and data services, postpaid with online content data messaging services, and prepaid;
   wherein the computer program product is operable such that multiple events associated with the customer are processed differently, based on the category associated with each of the multiple events and the policy associated with the customer;
   wherein the computer program product is operable such that the customer is assigned the policy associated with the customer according to an assigned set of services and event distribution rules;
   wherein the computer program product is operable such that the prioritization scheme includes a prioritization of the policies;
   wherein the computer program product is operable such that a first one of the policies that routes all events to the offline charging platform is associated with a lowest priority, and a second one of the policies that routes all events to the online charging platform is associated with a highest priority, such that when all the routing categories need to be processed by the online charging platform, the customer is associated with the highest priority policy;
   wherein the computer program product is operable such that the customer is assigned the policy associated with the customer by identifying the routing categories to be processed by the online charging platform, finding the lowest and highest priority policy that has an online value for the identified routing categories, selecting a policy that sends a minimal number of routing categories to the online charging platform and sends the rest of the routing categories to the offline charging platform.

12. A system, comprising:
a processor for receiving an event, and determining whether to process the event using an online charging platform or an offline charging platform based on a policy and a category;
wherein the system is operable such that, if it is determined that the event is to be processed using the online charging platform, the processor directs processing of the event using the online charging platform for billing a user for the event;

wherein the system is operable such that, if it is determined that the event is to be processed using the offline charging platform, the processor processing of the event using the offline charging platform for billing the user for the event;

wherein the system is operable such that the event is associated with the category;

wherein the system is operable such that each of a plurality of policies has a relation with each of a plurality of categories;

wherein the system is operable such that each policy indicates, for each category, whether to process the event using the online charging platform or the offline charging platform;

wherein the system is operable such that each policy allocates a minimal number of routing categories to the online charging platform, utilizing a prioritization scheme;

wherein the system is operable such that each category that prompts processing using the online charging platform is tracked in a list;

wherein the system is operable such that event is related to customer usage of a service associated with a customer;

wherein the system is operable such that the customer has one of the policies associated therewith;

wherein the system is operable such that it is determined whether to process the event using the online charging platform or the offline charging platform based on the policy associated with the customer;

wherein the system is operable such that the policy indicates whether the event is associated with services paid in association with a prepaid balance or services that are paid by a postpaid account, based on a plurality of parameters including at least one of customer accumulations, customer specific rating schemas, charging policies, and a customer balance;

wherein the system is operable such that the list is maintained for a group of users associated with a group level offer;

wherein the system is operable such that the policy is processed in real time upon receipt of the event;

wherein the policies include postpaid, postpaid with online content services, postpaid with online content and data services, postpaid with online content data messaging services, and prepaid;

wherein the system is operable such that multiple events associated with the customer are processed differently, based on the category associated with each of the multiple events and the policy associated with the customer;

wherein the system is operable such that the customer is assigned the policy associated with the customer according to an assigned set of services and event distribution rules;

wherein the system is operable such that the prioritization scheme includes a prioritization of the policies;

wherein the system is operable such that a first one of the policies that routes all events to the offline charging platform is associated with a lowest priority, and a second one of the policies that routes all events to the online charging platform is associated with a highest priority, such that when all the routing categories need to be processed by the online charging platform, the customer is associated with the highest priority policy;

wherein the system is operable such that the customer is assigned the policy associated with the customer by identifying the routing categories to be processed by the online charging platform, finding the lowest and highest priority policy that has an online value for the identified routing categories, selecting a policy that sends a minimal number of routing categories to the online charging platform and sends the rest of the routing categories to the offline charging platform.

* * * * *